United States Patent
Sanchez et al.

(10) Patent No.: US 8,694,895 B2
(45) Date of Patent: Apr. 8, 2014

(54) HUMAN INTERACTION WITH APPLICATION FROM EMAIL CLIENT

(75) Inventors: Lawrence Sanchez, Kirkland, WA (US); Jeff Staiman, Bellevue, WA (US); Zoltan Pekic, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 978 days.

(21) Appl. No.: 11/771,915

(22) Filed: Jun. 29, 2007

(65) Prior Publication Data

US 2008/0189622 A1    Aug. 7, 2008

Related U.S. Application Data

(60) Provisional application No. 60/888,277, filed on Feb. 5, 2007.

(51) Int. Cl.
*G06F 3/048* (2013.01)
*G06F 3/0482* (2013.01)
*G06Q 10/10* (2012.01)

(52) U.S. Cl.
CPC .............. *G06F 3/048* (2013.01); *G06F 3/0482* (2013.01); *G06Q 10/107* (2013.01)
USPC ............................ 715/752; 715/751; 709/206

(58) Field of Classification Search
CPC ...... G06F 3/048; G06F 3/0482; G06Q 10/107
USPC .................... 715/751, 752; 709/206
See application file for complete search history.

(56) References Cited

U.S. PATENT DOCUMENTS

| 6,539,302 | B1 | 3/2003 | Bender et al. |
| 6,650,440 | B1 | 11/2003 | Wing |
| 6,708,205 | B2 | 3/2004 | Sheldon et al. |
| 6,782,414 | B1 | 8/2004 | Xue et al. |

(Continued)

FOREIGN PATENT DOCUMENTS

| KR | 2000/0058954 | 10/2000 |
| WO | WO 2005/022345 | 3/2005 |
| WO | WO 2006/134226 | 12/2006 |

OTHER PUBLICATIONS

Liang and Tsai, Servicetizing User Experineces for Complex Business Applications, Aug. 7, 2006. pp. 11.*

(Continued)

*Primary Examiner* — Ece Hur
(74) *Attorney, Agent, or Firm* — Ben Tabor; Kate Drakos; Micky Minhas

(57) ABSTRACT

The embodiments described herein generally relate to systems and methods for providing human interaction with a business application from an email client. To complete a business process, individuals often must provide information to a business application. However, it may be difficult for the individual to interact with the application if the user is not familiar with the application's user interface (UI) or if it is necessary to navigate to the application's UI. Accordingly, it may be more efficient to interact with the application using a UI within an email client. User input for an automated business process can be submitted from a general-purpose email client. Benefits from such include providing input to a business application while working within the familiar email interface; not needing to switch contexts to complete work for the application; and completing work for the application while being offline or having limited corporate network connectivity.

17 Claims, 11 Drawing Sheets

(56) References Cited

U.S. PATENT DOCUMENTS

| | | | |
|---|---|---|---|
| 6,868,498 B1 | 3/2005 | Katsikas | |
| 6,910,018 B1* | 6/2005 | Okada et al. | 705/26.2 |
| 6,938,087 B1* | 8/2005 | Abu-Samaha | 709/227 |
| 6,947,943 B2* | 9/2005 | DeAnna et al. | 717/120 |
| 7,076,312 B2* | 7/2006 | Law et al. | 700/23 |
| 7,185,007 B2* | 2/2007 | Yagi | 1/1 |
| 7,366,759 B2* | 4/2008 | Trevithick et al. | 709/206 |
| 7,406,504 B2* | 7/2008 | Paul | 709/206 |
| 7,512,655 B2* | 3/2009 | Armstrong et al. | 709/205 |
| 2002/0002589 A1 | 1/2002 | Yonenaga et al. | |
| 2002/0026480 A1* | 2/2002 | Terada | 709/206 |
| 2002/0032668 A1 | 3/2002 | Kohler et al. | |
| 2002/0188638 A1* | 12/2002 | Hamscher | 707/530 |
| 2003/0204427 A1* | 10/2003 | Gune et al. | 705/8 |
| 2004/0068545 A1* | 4/2004 | Daniell et al. | 709/206 |
| 2004/0078434 A1* | 4/2004 | Parker et al. | 709/206 |
| 2004/0101142 A1 | 5/2004 | Nasypny | |
| 2004/0145769 A1* | 7/2004 | Collier et al. | 358/1.15 |
| 2004/0205772 A1* | 10/2004 | Uszok et al. | 719/317 |
| 2005/0034079 A1 | 2/2005 | Gunasekar et al. | |
| 2006/0015533 A1* | 1/2006 | Wolf et al. | 707/104.1 |
| 2006/0026178 A1* | 2/2006 | Wolf et al. | 707/100 |
| 2006/0059159 A1* | 3/2006 | Truong et al. | 707/10 |
| 2006/0064434 A1* | 3/2006 | Gilbert et al. | 707/104.1 |
| 2006/0224675 A1 | 10/2006 | Fox et al. | |
| 2006/0225032 A1* | 10/2006 | Klerk et al. | 717/105 |
| 2006/0294578 A1 | 12/2006 | Burke et al. | |
| 2007/0011083 A1 | 1/2007 | Bird | |
| 2007/0011258 A1 | 1/2007 | Khoo | |
| 2007/0043835 A1* | 2/2007 | Jung et al. | 709/219 |
| 2007/0073816 A1 | 3/2007 | Kumar et al. | |
| 2007/0078667 A1 | 4/2007 | Chand | |
| 2007/0179790 A1* | 8/2007 | Leitch et al. | 705/1 |
| 2007/0226250 A1* | 9/2007 | Mueller et al. | 707/102 |
| 2008/0046518 A1* | 2/2008 | Tonnison et al. | 709/206 |
| 2008/0177845 A1 | 7/2008 | Bracewell et al. | |
| 2008/0189622 A1 | 8/2008 | Sanchez et al. | |
| 2008/0263162 A1* | 10/2008 | Staiman et al. | 709/206 |
| 2009/0049123 A1* | 2/2009 | Dargahi et al. | 709/203 |
| 2009/0100010 A1* | 4/2009 | Dargahi et al. | 707/3 |
| 2009/0100367 A1* | 4/2009 | Dargahi et al. | 715/769 |
| 2010/0198927 A1* | 8/2010 | Tonnison et al. | 709/206 |
| 2011/0289161 A1* | 11/2011 | Rankin et al. | 709/206 |

OTHER PUBLICATIONS

Eller College of Management, Information Technology, "Trackit, Support Request processing Changes," Undated, 5 pp. http://it.eller.arizona.edu/docs/Trackit-Update.pdf.

Facilities Management Information Systems, Facilities Management Service Guide, Central Michigan University, May 2007, pp. 1-7. http://fmgt.cmich.edu/documents/FacopsWorkRequest%20UserGuide.doc.

Amendment and Response to Final Office Action dated May 25, 2010, cited in U.S. Appl. No. 11/941,004, filed Sep. 27, 2010; 19 pages.

U.S. Patent Office Final Office Action, U.S. Appl. No. 11/941,004, dated May 25, 2010, 25 pages.

Amendment and Response to Office Action dated Oct. 2, 2009, cited in U.S. Appl. No. 11/941,004, filed Feb. 2, 2010; 18 pages.

U.S. Patent Office Action, U.S. Appl. No. 11/941,004, dated Oct. 2, 2009; 23 pages.

PCT International Search Report and Written Opinion in International Application No. PCT/US2008/053098 mailed Jul. 17, 2008, 11 pgs.

PCT International Search Report and Written Opinion in International Application No. PCT/US2008/057378 mailed Aug. 18, 2008, 10 pgs.

U.S. Appl. No. 11/941,004, Office Action mailed Nov. 28, 2011, 24 pgs.

U.S. Appl. No. 11/941,004, Amendment and Response filed Feb. 28, 2012, 14 pgs.

U.S. Appl. No. 11/941,004, Office Action mailed Jul. 3, 2012, 30 pgs.

* cited by examiner

HUMAN INTERACTION WITH APPLICATION FROM EMAIL CLIENT

RELATED APPLICATION

This application claims priority to U.S. Provisional Application Ser. No. 60/888,277, filed on Feb. 5, 2007, and entitled, "Human Interaction With Application From Email Client," which is hereby incorporated in its entirety for all that it teaches.

BACKGROUND

In some situations, an automated business process requires input from a human so that the business application can complete the business process. For example, a business process may involve processes related to employee management, corporate and accounting practices (business practices), general business controls, and the like. The conventional strategy provides a user interface ("UI") for the human to interact within a business process application when communicating with the business process application itself. However, the human user may be unfamiliar with the business process application UI, causing delays, confusion and mistakes. Further, the user likely needs to switch contexts, e.g., switching from working within an email client to the business application, to complete the work in the business application. Further yet, the user is limited to working in circumstances where the business application itself can be accessed and thus is unable to work in a broader range of circumstances, e.g., working offline or with limited connectivity to a corporate network.

Such problems may invoke several types of latency into the business process. For example, individuals unfamiliar with the business application UI may spend additional time learning how the UI is organized and acquiring the requisite information needed for interacting with the UI. While a business application may provide a UI to the user to collect user input, the user is often required to open the application, including but not limited to navigation to a website, to complete the requested action. Unless the user opens the application frequently, delays (or latency) occur in providing the necessary input. As a result, the process instance of the business application may cease until it receives the necessary input.

Latency is also caused by the user not knowing that he/she is required to provide input to a business process. Further, even if the business application sends a message to the user whose input is required to alert him/her of the need for input, delays may still occur because the user is required to switch contexts as discussed above. Further, a delay may result from the need to navigate to a website outside of the email context in which he/she received the message in the first instance, also discussed above. Users may not want to take the time to navigate to a website outside of their email client UI and may delay providing the requested action.

Additionally, the user may not always have connectivity to the business application when the user wants to provide a response. For example, a mobile user may have greater connectivity to his/her email server than to corporate business applications and may complete work on his/her laptop with only occasional, or limited, connectivity to the user's corporate network.

These problems are exacerbated when multiple business applications require input from multiple end users. Although specific problems have been addressed in this Background, this disclosure is not intended in any way to be limited to solving those specific problems.

SUMMARY

Human interaction with a business process application from within an email client relates to systems and methods for receiving user input for an automated business process submitted from an email client. Receiving information, or user input, from an email client efficiently completes business processes in accordance with embodiments of the present invention because the individual (also referred to as the user) is generally more familiar with interacting with the email client. Besides familiarity, the user need not navigate away from the email client application, thereby further improving efficiency. Other embodiments also increase efficiency in that the user is able to provide the input requested by a business process application even if the user has limited, or no, connectivity to the corporate network at the time of responding.

In accordance with embodiments of the present invention, a method is provided for interacting with an application associated with a business process using a general-purpose email client. When an instance of an automated business process reaches certain states, the business application sends an email message to the user. This email contains a request to the user for information, such as the user's decision to approve or reject a request, that the application needs in order to proceed with completing that instance of the business process, along with supporting business data to help the user to make an informed decision about the input he/she provides. By displaying user interface (UI) controls within the email client, the user is allowed to take appropriate action on the business process without navigating away from the email client UI and by being able to take advantage of the familiarity of the email client UI. The method records any answers from the user in response to information requested by the business process application using an email client. The method sends the answers from the email client to the business process application for use in completing the business processes. The UI which is provided to the user in requesting a response records the information provided by the user in such a way that the business process application itself may interpret that response. The message sent by the user to the business application thus contains a record of the user's intent, such as an approval or a rejection to a requested action. By sending a process identification ("process ID") with the message, the message can be correlated by the application to a particular workflow instance, e.g., a request by an employee to join a distribution list. In an embodiment, the message from the application to the user can also have information about where to send the response to the business process application.

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope. The foregoing general description and the following detailed description should not be considered to be restrictive. Features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention.

DETAILED DESCRIPTION

Figure 1:
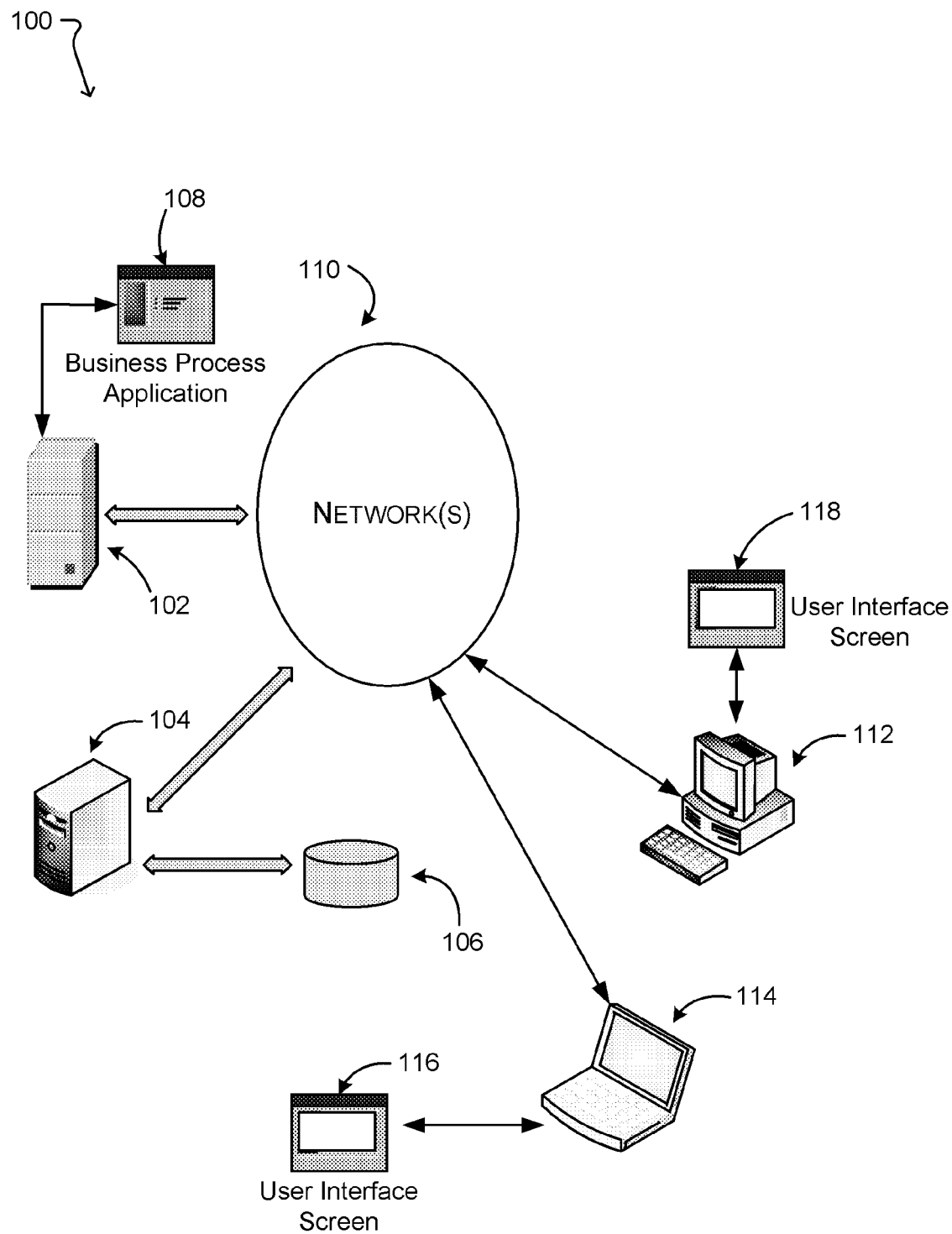
FIG. 1 illustrates a networked operating environment where embodiments may be practiced in accordance with aspects of the present invention.

The following detailed description refers to the accompanying drawings. Dashed lines may be used to show optional components or operations. Dashed lines may also be used to show logical representations or movement of a cell from one location to another. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Consistent with embodiments of the present invention, a method and system for interacting with a business process application via an email client is disclosed. Accordingly, embodiments of the present invention provide a user with a method for interacting with a business process application through the use of UI controls inside his/her email client. For example, such controls include, although are not limited to, "Approve," "Reject," text-entry fields, etc., depending on the particular request by the business application and possible responses. The availability of such controls within the email client provides the user with the ability to take action with respect to a business application from within the email client, instead of having to take the time to navigate to the application UI for purposes of taking such action and regardless of the user's connectivity to the user's corporate network. In an embodiment, the application UI is a website. In other embodiments, numerous types of application UIs, e.g., a win32 client/server application, reasonably known to those of ordinary skill in the art could be used. The message sent to the business application from within the user's email client indicates, or contains a record of, the user's response to the requested action. Where a process identification ("process ID") is sent with the message, the message is correlated by the application to a particular workflow instance, e.g., a request by an employee to join a distribution list. In embodiments, the message contains information about where to send the response to the business process application.

Referring to FIG. 1, a networked system 100 is illustrated for interacting with a business process application via an email client in accordance with an embodiment of the present invention. In a particular embodiment, the system comprises, among other features or modules, a processing unit operative to provide an interaction with a business process application which, in an embodiment, executes on a server, as well as a memory storage and a processing unit coupled to the memory storage. Upon the occurrence of a user-generated or system-generated event, the business application sends a request for information to a user via an email message. The system displays UI controls for responding to the requested information enclosed in the email message. In embodiments, these UI controls are displayed by an email client or email client add-in module, in which the UI controls displayed are based on the email message request type and correspond to actions which are meaningful to the business process application.

The response to the request for information may be in response to a question that can be answered without an explanation, for example "Yes" or "No," or "Approve" or "Reject." According to some embodiments, the user may, in addition to selecting a short-hand response by selecting or clicking on one of the user controls specifying, e.g., "Yes" or "No," be able to add an explanation, through the use of a text-entry box and an input device, for the selected response. Other embodiments may use check boxes, drop-down lists, auto-complete fields, radio buttons, etc. The data ultimately sent by the user in response to the request for information is used by the system to allow an automated process to proceed. Thus, upon receiving a response from the user, the system sends the recorded response to the business processing application for use in completing tasks and business processes within the business process application. Also, some user input, e.g., text entered by the user in a text-entry box, may have a purpose other than directing the business process application. Where a user provides a free-form textual response, this response may be recorded to capture the user's rationale for a particular decision and response action. Such user input may not be used to direct the next steps taken by the business process application but, rather, may be stored in contingency for an audit of the process itself, for example.

Turning to the specifics of exemplary networked system 100 shown in FIG. 1, this system includes, in an embodiment, a server computer system 102 running business process application 108. The business process application 108 is thus considered its own entity running on server 102. The server 102 communicates with a database server system 104 through a computer network 110. The database server 104 executes, in an embodiment, a database management system 106 that stores the data for the business process application 108. In an embodiment, the system 100 further includes a desktop computer 112 and a laptop computer 114, each having a user interface screen, shown as screens 118 and 116, respectively, in FIG. 1.

Networked system 100 transmits and receives data to and from the other computing devices, such as the server 102, the desktop computer 112, the laptop computer 114, and business process application 108 running on server 102 through the network 110. The displays on the desktop computer 112 and laptop computer 114 show UIs 118 and 116 which can and do display information for business process application 108. Examples of business process application 108 include applications companies use to manage their accounting, human resources, expense reporting, etc. Furthermore, networked system 100 transmits or receives data to server 104 and storage system 106. The data for business application 108 is stored in the database 106 that runs on server 104. In embodiments, the computer network 110 includes a secure network such as an enterprise network, or an unsecured network such as a wireless open network. By way of example, and not limitation, the computer network 110 may include wired media such as a wired network or direct-wired connection, and wireless media such as acoustic, RF, infrared and other wireless media.

It is worth noting at the outset that the networked system illustrated in FIG. 1 is merely an exemplary environment for practicing the present invention. For example, in embodiments, a server/component/abstraction layer is used to prevent the business application from having direct, intimate knowledge of how to communicate with the email server and/or how to route a message(s) to users. In embodiments, the business application has knowledge of the mapping between users and email addresses. In other embodiments, the business application does not have such mapping information. Further, the choices of "Yes" and "No" are offered by way of example only. In further embodiments, numerous types of responses and answers, e.g., "Expire," "Extend," "Add," "Remove," etc., reasonably known to those of ordinary skill in the art are provided.

Further, in the embodiment illustrated in FIG. 1, the business process application 108 runs on server 102. In this embodiment, the application on the server 102 has most of the business logic, e.g., when the server application gets the user response, etc. Determinations of the necessary tasks for execution, for example, are based on the logic/business rules stored on the server. In other embodiments, however, the application on server 102 has all of the business logic. While two servers, e.g., 102 and 104, are shown in the embodiment illustrated in FIG. 1, other embodiments have one server running both the business process application 108 and the database 106. Further, in an embodiment, other computing devices also participate in the networked system 100. Also, while in one embodiment the network is operated by one company, in other embodiments, the network can be operated by multiple companies. Further, the company that operates the network or some parts of the network can be contractors to the company whose business is at issue, according to another embodiment. In addition, while a single module may both send an email message from the business process application to an email client and send the user's response to the application from the email client, separate modules may be used for such transmittal in accordance with other embodiments of the present invention. The exemplary environment of networked system 100 may be considered in terms of the specific components mentioned, e.g., server, processor, storage system, etc., or, alternatively, may be considered in terms of the analogous modules corresponding to such units, e.g., transmittal module, processing module, recording module, display module, etc.

Figure 2:
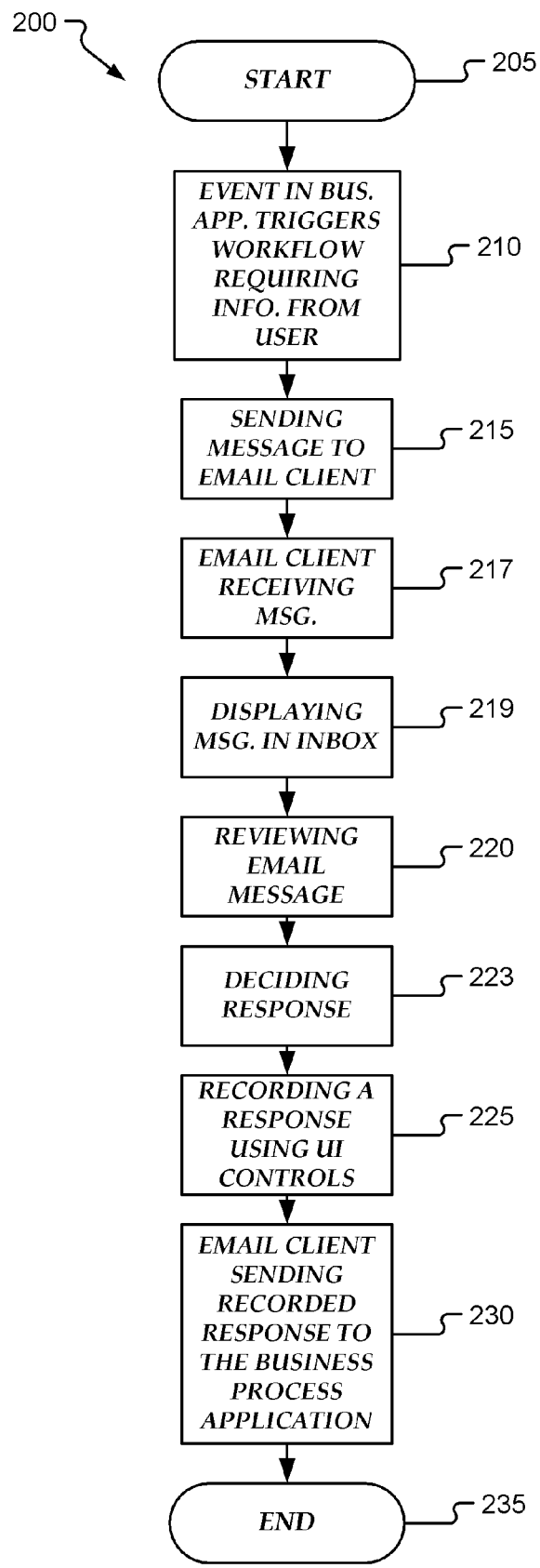
FIG. 2 is a flow diagram illustrating the operational characteristics of a method for human interaction with a business application from a general-purpose email client in accordance with an embodiment of the present invention.

Using a computing device, such as computing device 112 or 114 of FIG. 1, FIG. 2 sets forth the general stages involved in method 200 for interacting with a business process application via an email client in accordance with an embodiment of the invention. Method 200 begins at starting block 205 and proceeds to trigger operation 210 where an event in a business application triggers a workflow requiring a request of information from a user. For example, the business application may require the user's approval or rejection of a request for an employee to join a distribution list, wherein the user is the owner of that distribution list. According to some embodiments, a user interacting with the system generates the event triggering the subsequent workflow requesting information, or, in other embodiments, a system-generated event triggers the workflow. The event that triggers the workflow is sometimes system-generated and sometimes user-generated, even within a particular embodiment.

Next, send operation 215 sends a message to the email client via an email message to elicit information required from the user by the business processing application, such as business application 108 shown in FIG. 1. In an embodiment, this message includes both the requested action and a process ID to enable the business application to associate the message with the necessary workflows for processing the response once received from the user. In an embodiment, the message also contains data that describes where the user's response should be sent, e.g., to the email of the application mailbox or URL of the web service. For example, this data is the email address that appears in the "From:" field of the email. In another embodiment, the email contains the URL for the web service that can process the response to the business process application. In yet another embodiment, an email plug-in employed to facilitate communications with the email client and user is configured to send all responses to a single destination. In further embodiments, the email client or plug-in sends the response to an address it determines as a function of the application which sent the message to the user, and, according to some embodiments, as a function of the user's response. For example, the email client maintains a list that tells it where to send responses that relate to expense report approvals, where to send responses that relate to purchase order approvals, etc. Additionally, the client may send the message to a different address based on the content of the user's response, e.g., if the user's response is "Delegate," the message is sent to a different endpoint than if the response is "Approve" or "Reject," in accordance with an embodiment of the present invention.

The email also contains information to help the user provide appropriate input. For example, the business processing application 108 of FIG. 1 sends an email message to the user through an email client, such as, by way of example only, Microsoft Office Outlook 2007®. Any type of general-purpose email client may be used. General-purpose email clients include, but are not limited to, email clients executing in a dedicated program on a local computer, i.e., a "rich client," or email clients whose functionality is realized by code executing on a server, with functionality on the client limited primarily to rendering the UI, i.e., a "web client" or "thin client." Microsoft Outlook® is an example of a "rich" email client, while Microsoft Outlook® Web Access® is an example of a "web" email client. As noted, any type of general-purpose email client known to those of ordinary skill in the art may be used in accordance with embodiments of the present invention.

To provide a conduit between the business processing application 108 and the user's email client, a plug-in may be employed to facilitate communications. Or, the functionality of the conduit for communications between the business processing application and the email client may be integrated into the email client and/or to another server in the network.

Following the sending of the email message 215 to the email client, process 200 proceeds to receive operation 217, in which the email client receives the message. Next, in display operation 219, the message is displayed in the user's email inbox, which allows the user to recognize the existence of the email. In alternative embodiments, a fading display occurs, which allows the user to see that an email has come in and select to open it, without ever going to the inbox itself. In other embodiments, the displaying of the message, or other notification means, may be accomplished through any number of means reasonably known to those of ordinary skill in the art. Process 200 then proceeds to review operation 220, in which the user reviews the message by either opening the message (message explorer view) or by viewing it in the preview pane in accordance with embodiments of the present invention. The requested information may take the form of a question with one or more selection boxes indicating possible answers to the posed question, or the like. In either opening the message or viewing it in the preview pane, user controls associated with the requested action, for example, "Approve," "Reject," etc. are displayed. If the message is opened, the approve/reject controls (or other type of controls) are displayed on the toolbar, or ribbon. Alternatively, in a preview pane view of the message, the approve/reject options are displayed by right-clicking or by looking in the Actions menu if the approval messages are selected in the inbox. In another embodiment, the approve/reject controls are visible in the preview pane itself. In review operation 220, the user reviews the information included in the email (e.g., which user made the request, when did the user make the request, what action did the request specify, such as which user would be added to which email distribution list, what justification did they give for this request, etc.) to determine how a business flow or task should be conducted by the business processing application 108.

Next, in decision operation 223, the user decides what response to give to the requested action or question, e.g., "Should Employee X be allowed to join your distribution list Y?" As indicated by the designation of the distribution list "Y," the user may be an owner of multiple distribution lists, groups, etc. Working with the UI controls within the email client UI itself, the user indicates what action to take by selecting a control, in which this response to the email message is recorded in operation 225. Thus, the user records a response by responding to the email in accordance with an embodiment of the invention. In other embodiments, such recording of a response may be accomplished through any number of means reasonably known to those of ordinary skill in the art. For example, in an embodiment, the user has the alternative to record his/her response on the application's website, such as through the use of a web portal or other native application UI. The native UI can coexist with allowing interaction via email, such that the user can choose whichever means to record his/her response. In responding to the email message, the user may also include a business justification by typing in a text-entry box. Finally, the email client sends the recorded response to the business process application in operation 230, in which the message includes both the response and the process ID to enable the business application to associate the proper workflow(s) with the received response. In an embodiment, an indirection layer allows for decoupling between the client and the business process application. Process 200 then terminates with end operation 235.

Figure 3A:
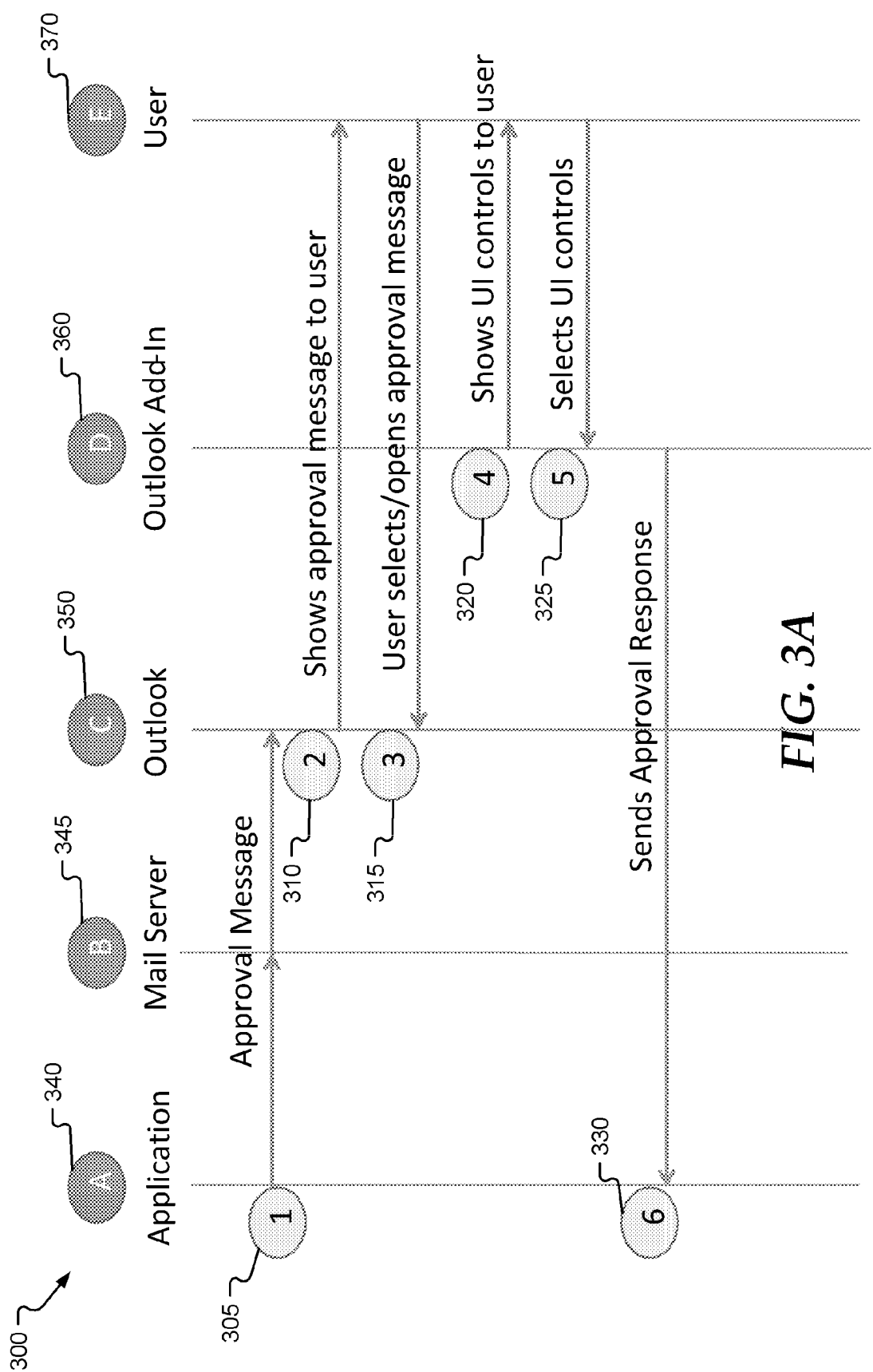
FIG. 3A is a detailed flow schematic depicting the operational characteristics of a method for human interaction with a business process application from a general-purpose email client in accordance with an embodiment of the present invention.

Turning to FIG. 3A, the general stages involved in method 300 for interacting with a business process application via an email client are illustrated in accordance with an embodiment of the invention. To send email to the email client, business application 340 goes through one or more servers. At stage 305, a server-based business application 340 sends an approval message to the end user 370 via the user's email server 345 and email client 350. In other words, mail from business application 340 goes through email server 345 to reach the user's email client 350. As noted, while email client 350 is labeled as "Outlook," any type of general-purpose email client may be used in accordance with embodiments of the present invention. Server-based business application 340 sends messages to users when specific events occur, per business processes defined by the customer and stored appropriately according to an embodiment of the present invention. Any type of message requiring input or a response may be sent to the user 370. Given the numerous types of business applications possible, there are many types of events and corresponding workflows which may trigger the sending of notifications to users, e.g., "Extend," "Expire," "Reject," "Remove," "Join," "Add," etc.

In an embodiment, the approval message includes information that allows a user 370 to formulate a conclusion and provide a course of action for the business processing application 340. For example, the information may allow the user to make a decision about whether to approve the request or not. In embodiments of the present invention, the approval message also includes a process ID for coordinating approval messages and responses with associated business processes or tasks executed by server-based business application 340. The email client 350 displays the approval message to the user 370 via an electronic mail (email) message to the user's 370 message inbox. At stage 310, the email message appears in the user's email inbox, and the message is displayed such that, for example, the user sees the message when he/she looks at the inbox. At stage 315, the email message is opened and, for example, the user may review the information provided by the business process application. By reviewing the business processing application information using the user's inbox, the user may make a decision about what input to provide and may interact with the business processing application in an environment familiar to the user 370. Also, the user is more likely to respond to the requested action since he/she may give an answer within the email context instead of having to open an application, or to navigate to a website through a hyperlink, for example, embedded in the message.

In an embodiment, functionality for sending the approval message to the user 370 is implemented using email client Add-In 360. While email client Add-In 360 is labeled as "Outlook Add-In," any type of general-purpose email client may be used in accordance with embodiments of the present invention. In an embodiment, Add-In 360 communicates with server-based business application 340 via web services. Further, Add-In 360 integrates with the email client 350 using publicly disclosed APIs in accordance with an embodiment of the present invention. Add-In 360 provides the UI that allows the user to record his/her input and to send that input back to the server-based business application 340. In an embodiment, Add-In 360 modifies the email client to ensure appropriate UI controls are available to the user depending on the user's context, e.g., the selections made or items opened by the user, etc. Add-In 360 thus provides UI functionality that may not be included in the email application, and in some embodiments, Add-In 360 records the user's response and, in other embodiments, plays a role in communicating the user's response to the business process application. The functionality provided by Add-In 360 allows the email client 350 to distinguish between an approval message and a normal email message in order to provide additional functionality needed for approval messages, for example, additional response buttons. For example, Add-In 360 recognizes that the message is an approval message that requires user input to an automated business process and adds UI controls to the toolbar in the opened window of the message (also referred to as the message explorer view), to the Actions menu when the user selects one or more approval messages in the inbox, or to the box appearing when the user 370 right-clicks on one or more messages in the inbox. In embodiments, "Approve" or "Reject" buttons or icons can be added, and other buttons or icons, e.g., Reply or Reply-to-All, can be disabled or hidden from the user for actions that do not contribute to the completion of the particular business process. Alternatively, the additional functionality can be determined from the approval message itself. For example, the approval message not only tells the UI to display the buttons for "Cancel" or "Delegate," but it also describes how to display these buttons, even if these controls were not specifically included in the email client 350 or any Add-In 360. In embodiments, functionality is also integrated into the email client 350 itself.

At stage 320, the email client Add-In 360 provides a UI, i.e., shows UI controls that allow the user to record input to the message, e.g., approve or reject it, to the user 370 for interacting with the approval message. At stage 325, the user 370 provides a response to the message, which is recorded. In an embodiment, the response by the user 370 is indicated by, for example, clicking a button on a toolbar that reflects the user's 370 intent for a business process or task. The response may be a simple response, "Yes" or "No", "Extend" or "Retire", "Complete" or "Not Complete" or something more detailed. For example, the user may click "Approve," type a business justification, and then click "send." In another embodiment, when the user clicks "Approve," a dialog box appears, in which the user may enter text in the business justification field and then click "send."

Next, at stage 330, the email client Add-In 360 sends the recorded response to the server-based business application 340. This response includes the user's input and the process ID. The server-based business application 340 uses the process ID to determine to which workflow the user's input should be applied. The business process application uses the received response to navigate a predetermined decision tree that prescribes which tasks the application should complete, in order to properly complete that step in the business process, such as adding a user to an email distribution list. In an embodiment, Add-In 360 knows the endpoint of where to send the recorded response. Such is particularly the situation where the Add-In 360 sends replies to only one application in accordance with an embodiment of the present situation. In other embodiments, Add-In 360 or the email client 350 determines the endpoint of where to send the recorded response by correlating the specific type of message to a configurable, stored list that specifies the endpoints for different message types. In further embodiments with multiple applications using automated workflows, each application sends email messages to the user's inbox. The add-in determines the endpoint of where to send the recorded response based on the email address provided or other information contained in the request for information from the business process application. In further embodiments yet, at stage 330, Add-In 360 sends a specially-formulated email to email server 345 where the message is stored in a mailbox configured for that purpose. The business application then monitors the mailbox on email server 345 for such responsive email messages. In other embodiments, any number of means could be used for determining the endpoint of the message as understood by those of ordinary skill in the art.

While Add-In 360 communicates with the server-based business application 340 via web services in an embodiment of the present invention, in other embodiments, the email transport, or email system, is used to transport the message. Such capability may enable the user to complete work at a more convenient time or physical location since the user may have greater connectivity to his/her email server than to his/her corporate business applications. Email clients may have facilities for composing replies to, or otherwise viewing and/or responding to, email while not connected to a network, or for sending email while connected to the public internet but not connected to a private corporate network which hosts a business process application. Further, in an embodiment, the email client add-in module is not a separate module but, instead, is integrated in the email client, as noted above. In another embodiment, where an add-in is used, the system updates or increases the functionality of the non-functional, or legacy, version.

Figure 3B:
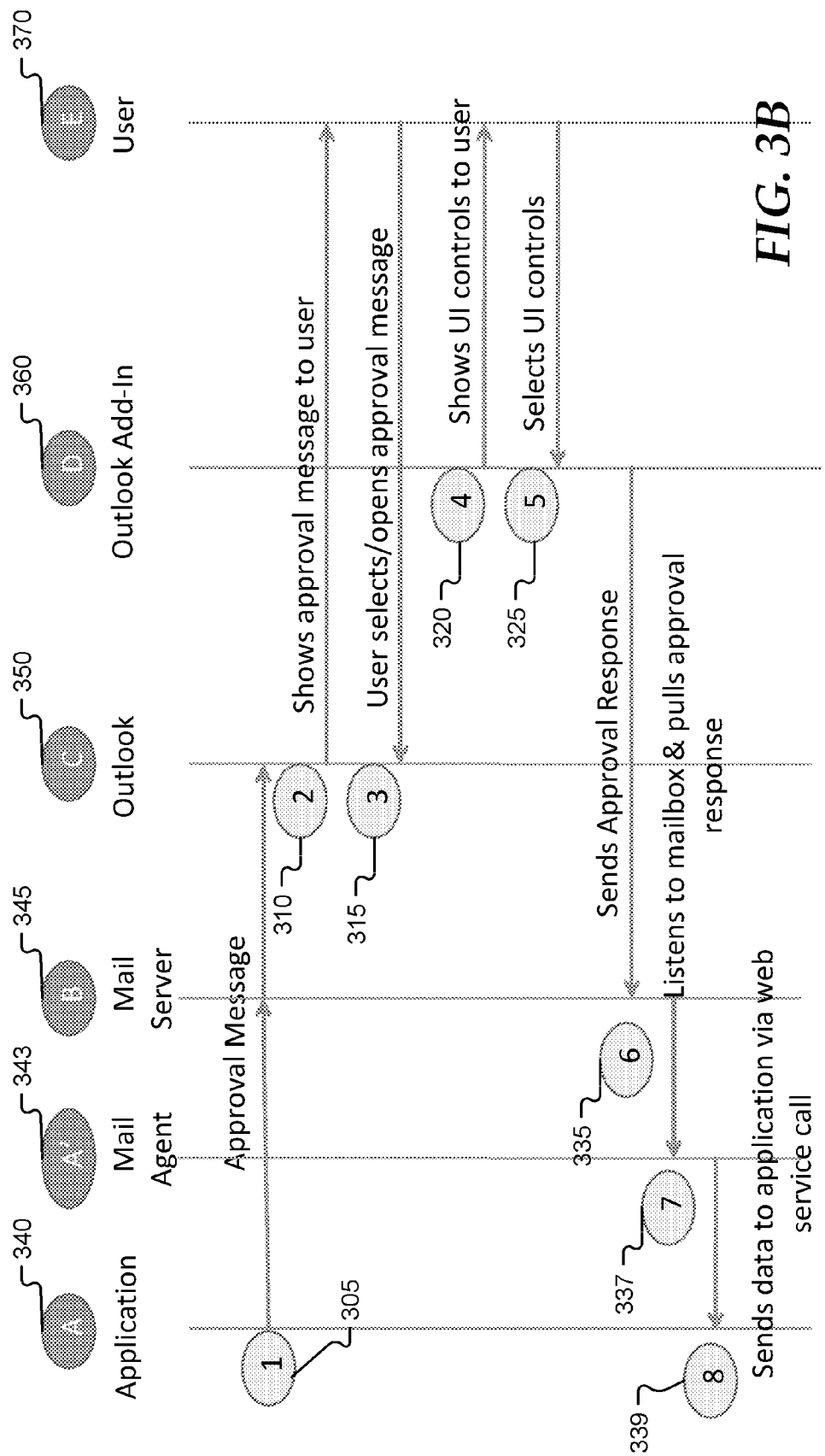
FIG. 3B is a detailed flow schematic illustrating the operational characteristics of a method for transporting an approval response via email in accordance with an embodiment of the present invention.

FIG. 3B illustrates the use of the email transport, or email system, for transport of the message and message response in accordance with an embodiment of the invention. Like structures and elements are shown with like reference numerals for FIGS. 3A and 3B. To illustrate the use of an email transport, or email system, for transporting of the message, FIG. 3B depicts the situation where a client sends email with the approval response 335 to a particular mailbox on the email server 345 that is configured to receive responses for the relevant business application. Or, in accordance with other embodiments, the message is sent to the client's email server 345 which sends it to the application's email server (not shown). FIG. 3B depicts mail agent 343 which likely resides on the same server as the business application. At stage 337, mail agent 343 monitors, or listens to, the mailbox on the email server 345 and pulls messages from it when they arrive. Next, at stage 339, mail agent 343 takes the message, composes the appropriate web service call, and communicates to the business application via a web service call. The user is thus able to derive the connectivity benefits of using the email transport, or email system, while allowing the business application to process requests based on standardized web services.

In other embodiments, message transporting occurs by storing and deferring the web service call from Add-In 360 to the server 345 until such time as the user has connectivity to send the web service call. Such mode could be facilitated by exposing the business application in the extranet, for example.

Figure 4:
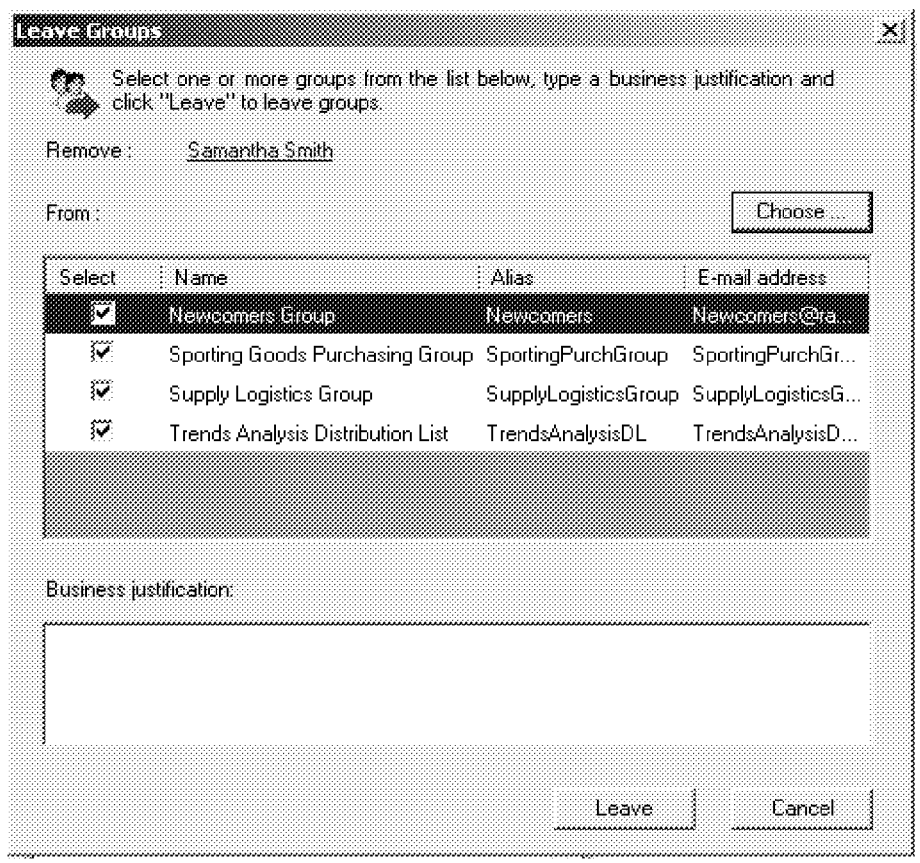
FIG. 4 is an exemplary screen shot of a user interface in accordance with an embodiment of the present invention.

FIG. 4 is an exemplary screen shot of a UI 405 showing a type of business application requiring input from a user and an opportunity for the user to provide a business justification for the action in accordance with the present invention. UI 405 is not shown in an email context in FIG. 4, but is offered for purposes of illustrating input demands triggering associated workflows to remove a user from a group, as an example. In other embodiments, this UI 405 is in an email client. User interface screen 405 displays an interface in which a user may remove members from a group. For example, an employee responsible for maintaining a business standard for a company may have changed roles at the company and is no longer allowed to access any business standards information for the company. Accordingly, a user may select members to be removed from the group via user interface screen 405.

Figure 5A:
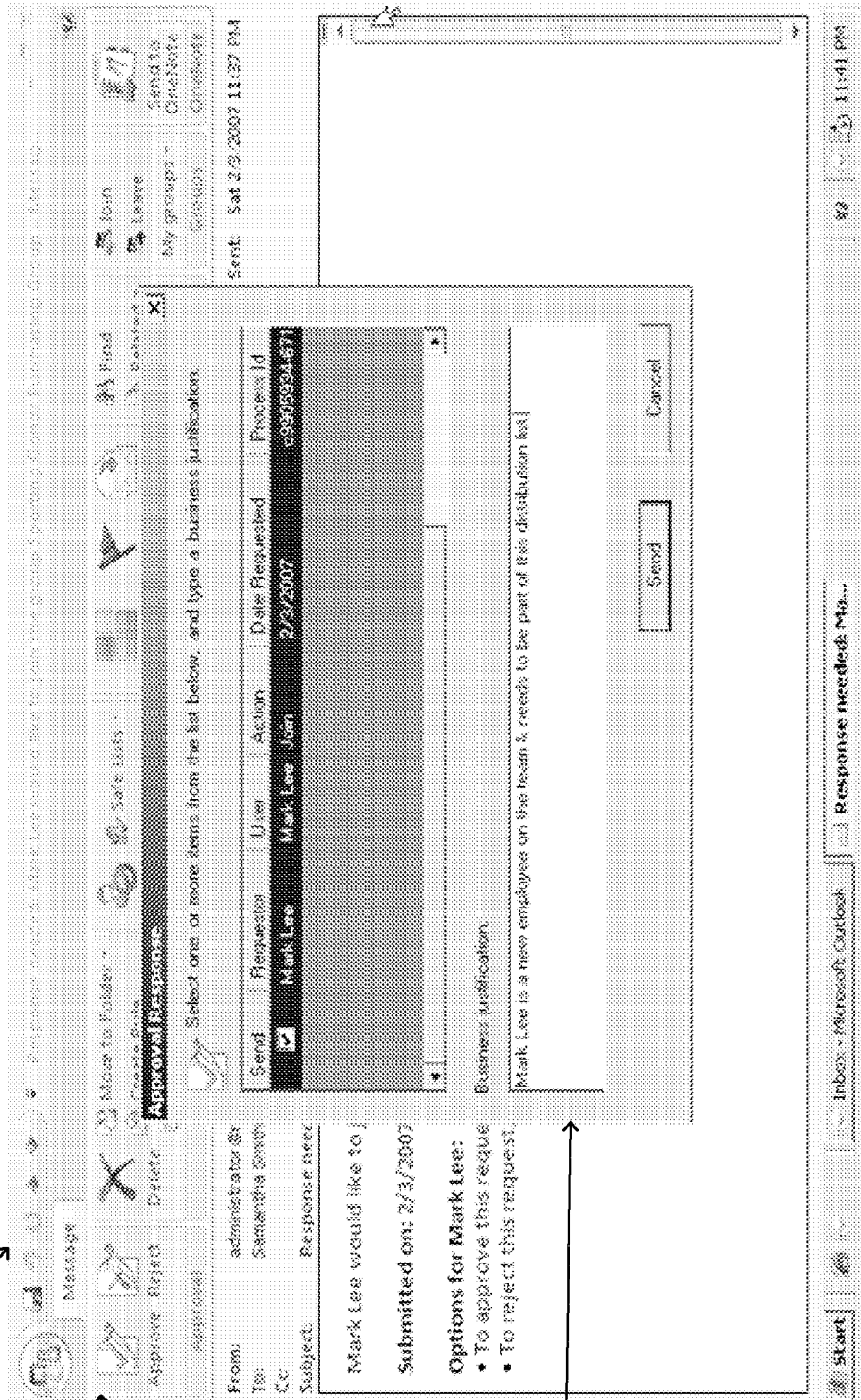
FIG. 5A is an exemplary screen shot of a user interface showing, among other features, UI approve/reject controls and a business justification text-entry box in accordance with an embodiment of the present invention.

FIG. 5A is an example screen shot of a UI requiring input in an email context for purposes of a business application in accordance with an embodiment of the present invention. An example dialog box 510 is also shown. User interface screen 505 displays an email message request (approval message) for adding a member to a distribution list, for example. In a particular embodiment, the UI screen 505 is displayed in response to a request via UI screen 405. In an embodiment, the request is originated by another user, such as by the user of screen 405, and is to be processed, e.g., approved or rejected, by a different user using screen 505. For example purposes, screen shot 405 could show a request that a member be added, or joined, to a group. The approval message may be sent, for example, to a group manager, or group owner according to some embodiments, responsible for the group in question in accordance with an embodiment of the invention. Accordingly, the manager has the responsibility of maintaining the integrity of the group. Upon receipt of the email message, the manager utilizes approval section 507 to select an appropriate response to the approval message requesting the addition of a member to the group. For example, the manager may accept the addition of the requested member to the group by clicking on an "accept" button in approval section 507. In embodiments, approval section 507 is implemented through an action menu, toolbar, ribbon, a complete email screen (message explorer), or the like. Depending on the functionality required to respond to the approval message using approval section 507, the email client 350 can display approval buttons upon opening an approval message. Other normal email message functionality can also be disabled when interacting with an approval message. The display of necessary approval or rejection buttons and the disabling or hiding of other buttons can also occur, as noted, in the box opened as a result of right-clicking on the message in the inbox without opening the message into a complete email screen.

The manager can use section 510, which appears after selecting, or clicking, response 507, to provide additional information related to the reasoning behind the response selected in section 507. Upon responding to the approval message, the response is recorded and sent back to a server with the appropriate process ID for use by a business processing application in completing joining of the member to the group through associated workflows. In responding, the response has some data that is used by the business process application for certain actions, such as based on whether the response is "approve" or "reject" 507. Also, the response can have some data that is recorded for other purposes, such as for auditing or to facilitate other potentially related human decisions. For example, the specific text of what the user may write in the business justification text-entry box shown in window 510 will probably not be used by the business process application to decide what steps to complete next in accordance with an embodiment of the invention.

Figure 5B:
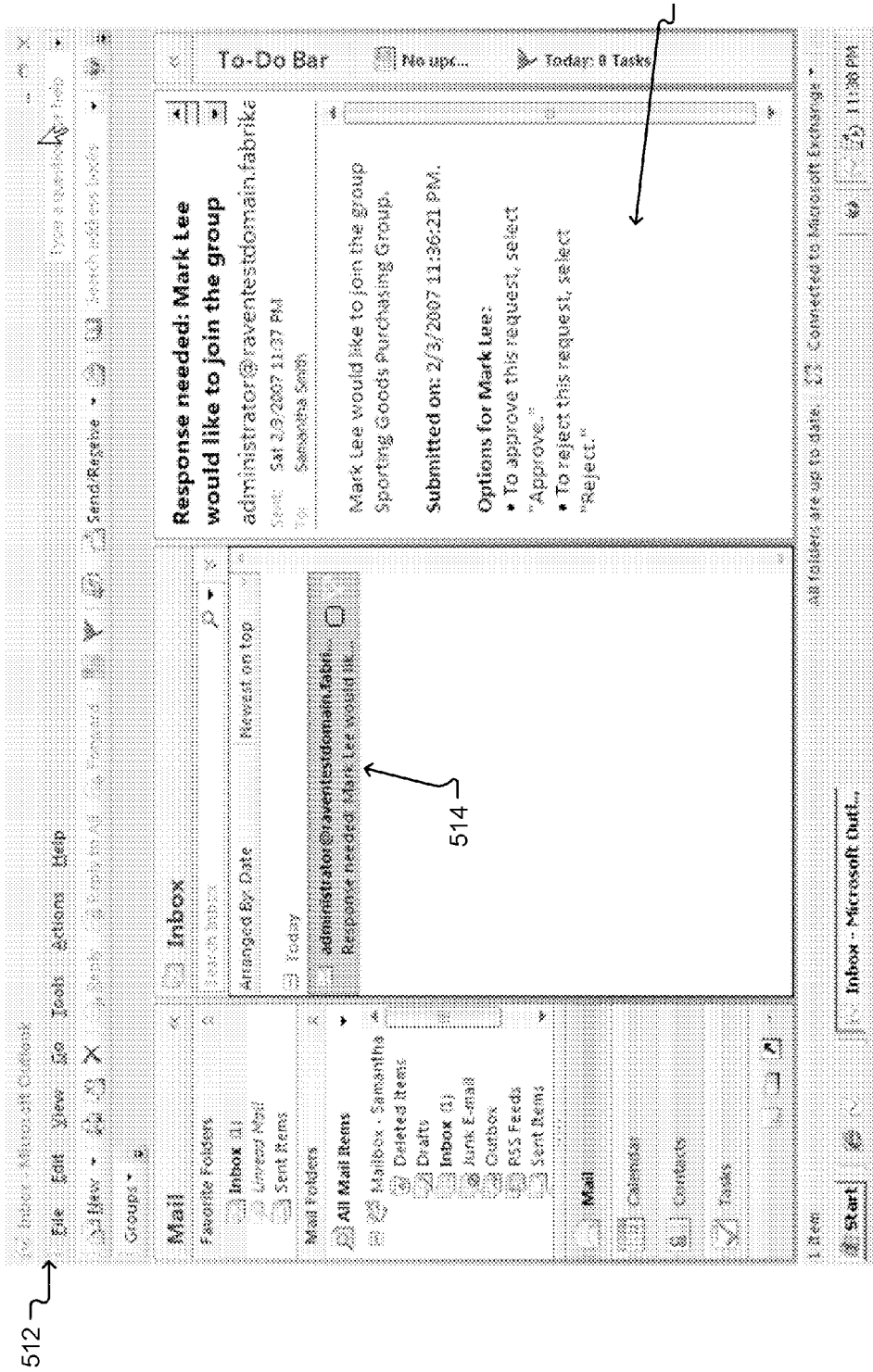
FIG. 5B is an exemplary screen shot of a user interface showing, among other features, a single approval notification listed in the user's inbox of the email client and a preview pane of the approval message in accordance with an embodiment of the present invention.

Similarly, FIG. 5B is an exemplary screen shot of a user interface 512 showing, among other features, a single approval notification 514 listed in the user's inbox of the email client and a preview pane 516 of the approval message in accordance with an embodiment of the present invention. As shown, preview pane 516 and the subject line in the notification item listed 514 in the inbox indicate that a response is needed for a particular workflow to be triggered, i.e., for "Mark Lee to join the Sporting Goods Purchasing Group." As shown in preview pane 516, the user is given the option of approving the request by selecting "Approve" or rejecting the request by selecting "Reject." In an embodiment, while viewing the message in the preview pane, the user can approve or reject the request by accessing the context menu, i.e., the menu activated by right-clicking the mouse input device, or by selecting "approve" or "reject," by selecting from the Actions menu. The UI controls to approve or reject may not be visible in the screen of the preview pane until the user right-clicks or clicks on the Actions menu, according to some embodiments of the present invention. In other embodiments, these UI controls are visible in the screen of the preview pane, in which the user may click on an "Approve" or "Reject" button in the preview pane itself. Again, the use of "buttons" and the labels therefore, i.e., "Approve" or "Reject," are offered by way of example only.

Figure 5C:
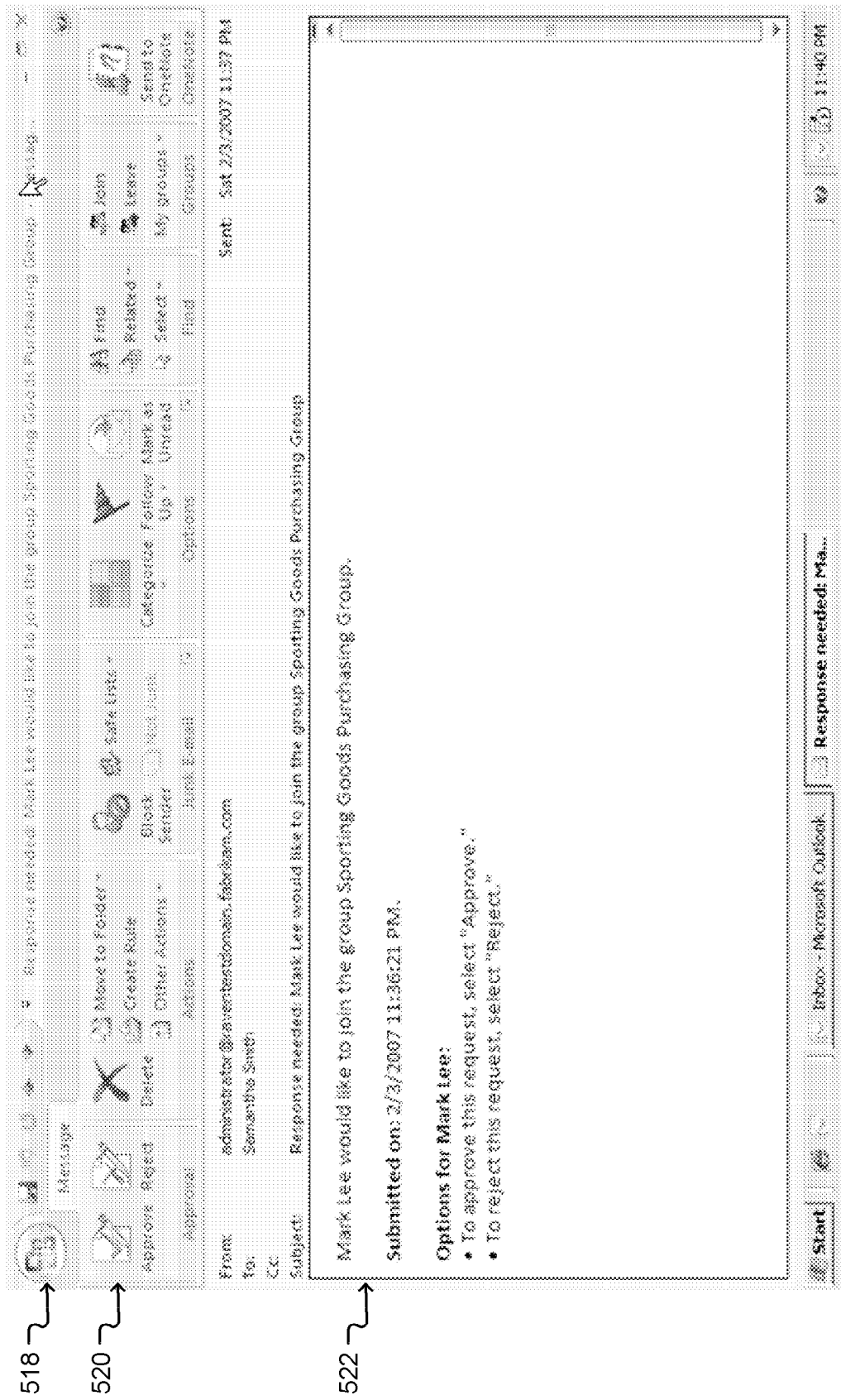
FIG. 5C is an exemplary screen shot of a user interface showing, among other features, a message explorer view of an opened approval message in accordance with an embodiment of the present invention.

While FIG. 5B displays a preview pane and approval message listed as a single item in the user's inbox, FIG. 5C is an exemplary screen shot of a user interface 518 showing, among other features, the message explorer view 522 of the opened approval message in accordance with an embodiment of the present invention. The message explorer view 522 shows the request, "Mark Lee would like to join the group Sporting Goods Purchasing Group," and, for example, the date of the request, and the options available, i.e., to approve the request by selecting the "Approve" icon on the toolbar 520 or to reject the request by selecting the "Reject" icon on the toolbar 520.

As noted above, while FIGS. 5A, 5B and 5C show "Inbox-Microsoft Outlook" on the windows 505, 512 and 518, e.g., as seen on the button on the gray-shaded bar at the bottom of window 505 and at the top of window 512, any general-purpose email client may be used in accordance with embodiments of the present invention.

Figure 6A:
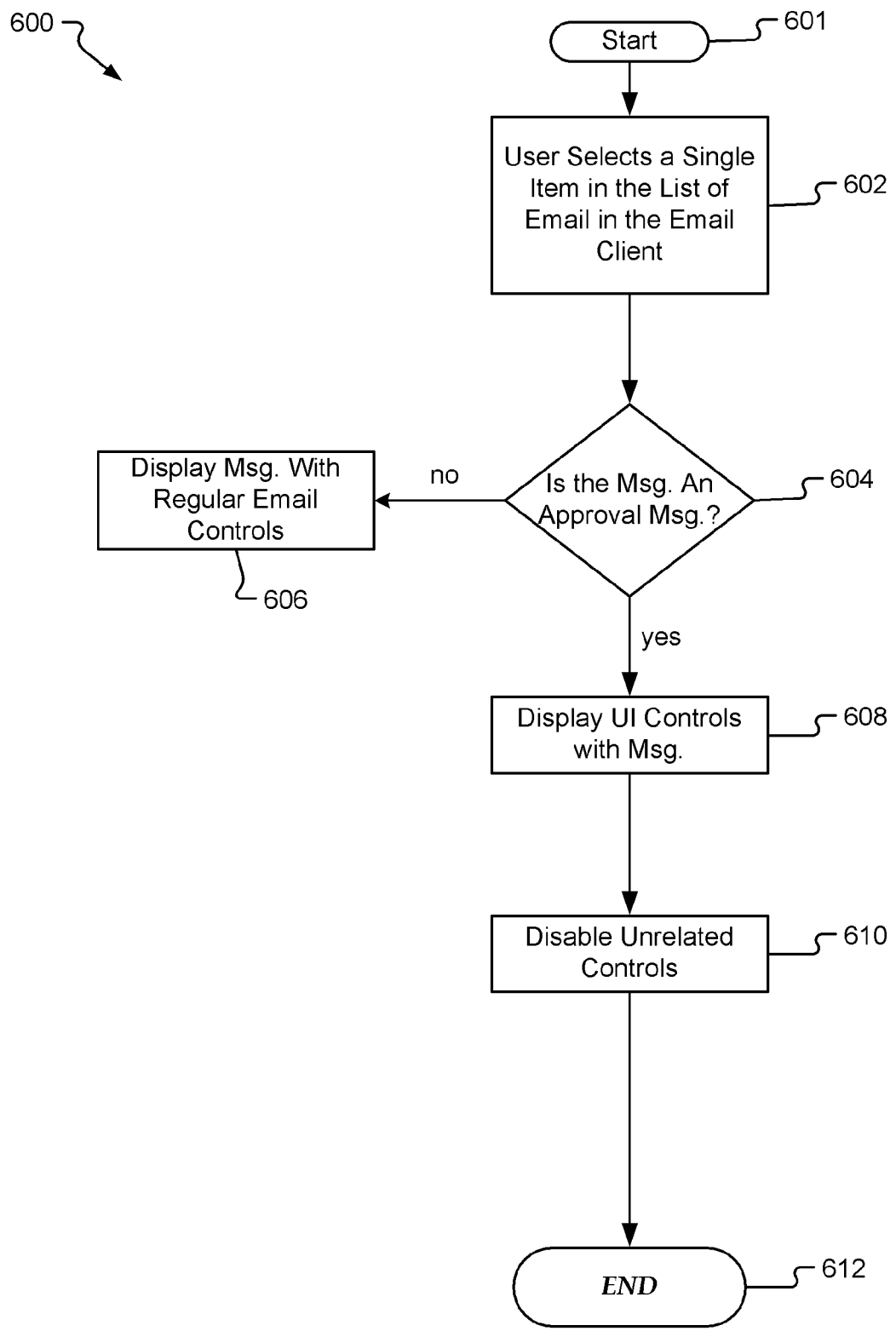
FIG. 6A is a flow diagram depicting the operational characteristics of a process for determining whether UI controls related to a business application should be displayed when a user selects a single item in the list of emails in the email client in accordance with an embodiment of the present invention.

While FIGS. 5A, 5B, and 5C depict UI controls in the UI of a general-purpose email client, FIG. 6A illustrates the operational characteristics for determining whether to display UI controls related to a business application in the email client when a user selects a single item in the list of emails in the email client. Start operation 601 is initiated and process 600 proceeds with a user selecting a single item in the list of emails in the email client in user select operation 602. This selection may be upon receipt of an email, or it may be at many other instances. For example, the user may select an email within the email client that is not the email most recently received. Following the selection of an item 602, process 600 proceeds to query operation 604, in which it is determined whether the message received is an approval message, i.e., one requiring UI controls to allow the user to send a message to an application other than the general-purpose email/calendar server within which the user is working in the email client. In an embodiment, the determination of whether the message is an approval-type message is accomplished by analyzing the "message class" of the email item, which is a property of the email that describes the email to the email client and/or the email client add-in. In another embodiment, this determination is made by including a hidden, or invisible, payload in the message of the email sent from the server. When the invisible payload is present, the add-in module treats the message as an approval message. In a further embodiment, the text of the subject line of the message is analyzed to determine the type of message. In other embodiments, such determination may be accomplished through any number of means reasonably known to those of ordinary skill in the art. If the message is not an approval message, flow branches NO to display message 606, in which the email message is displayed by the email client with the regular email controls, i.e., without "approval" controls, for example.

If the message is an approval type of message, flow branches YES to display UI controls operation 608, in which the UI controls specific to the action requested are displayed, such as "Approve," "Reject," etc. as shown with icons 507 in FIG. 5A. The approval message tells the UI to display such UI buttons. Process 600 then proceeds to disable controls icon 610, in which controls unrelated to the approval message are disabled. Such controls could include, for example, "Reply," "Reply to All," etc., since the business application would likely not want a Reply but, rather, a requested action from the user. The display of the UI controls and disabling of others occur in numerous UI types in other embodiments. For example, and as noted above, the controls can appear in the toolbar of an opened message (message explorer view), or they can appear (or be disabled) in the box which appears when the user right-clicks on the message in the inbox view. Upon displaying the necessary controls and/or disabling others, process 600 terminates at end operation 612.

Figure 6B:
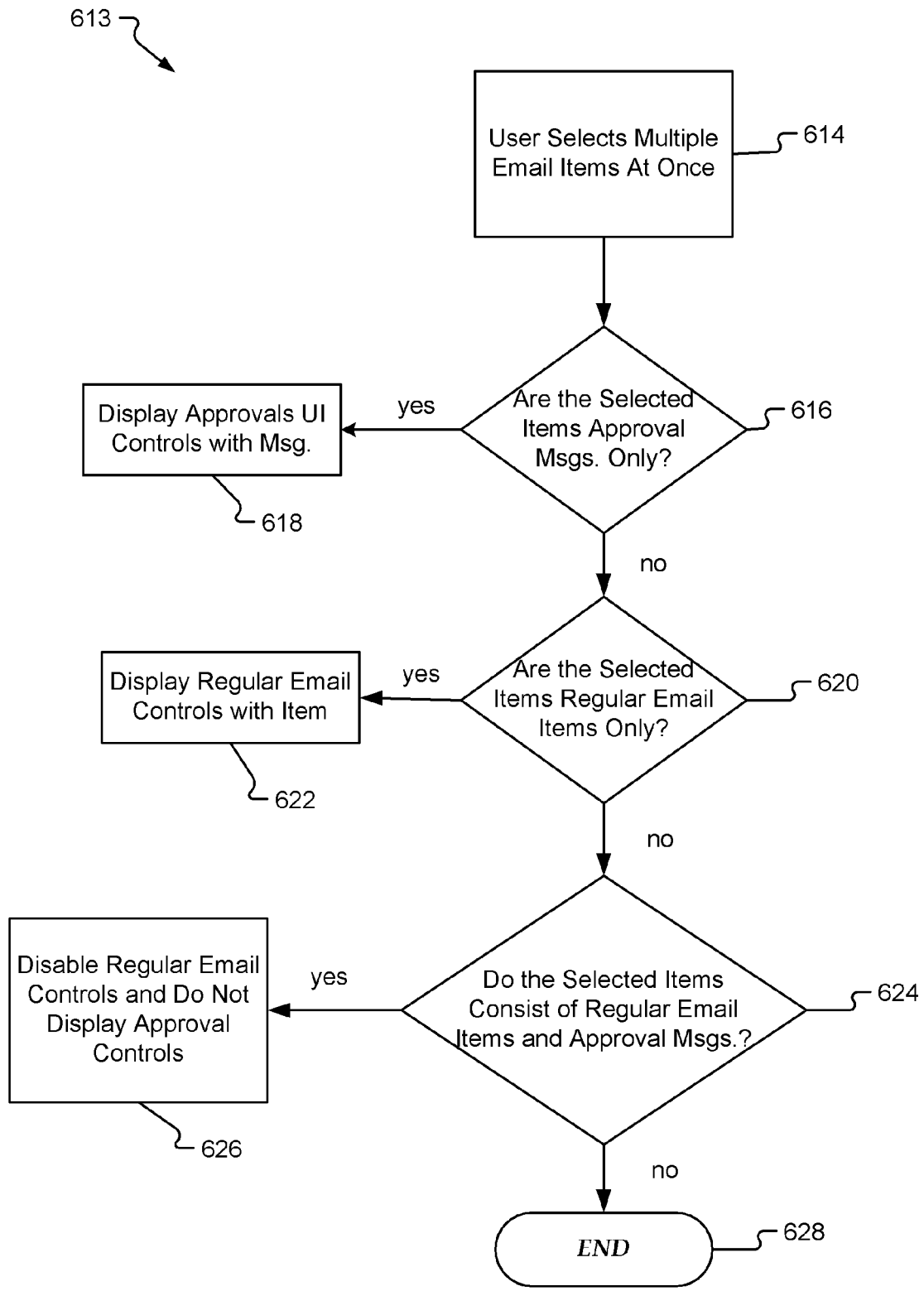
FIG. 6B is a flow diagram illustrating the operational characteristics for determining whether to display UI controls related to a business application in the email client when a user selects multiple email items at once in accordance with an embodiment of the present invention.

Turning now to FIG. 6B, this figure illustrates the operational characteristics for determining whether to display UI controls related to a business application in the email client when a user selects multiple email items at once in accordance with an embodiment of the present invention. Process 613 begins when the user selects multiple email items at once in the email client in select operation 614. Since multiple items are selected, the process determines which controls to display, disable or not show, i.e., approvals UI controls or regular email controls, etc. Next, process 613 passes to query operation 616, in which it is determined whether the user has selected one or more approval notifications only, i.e., no regular email items. If only approval messages have been selected, flow branches YES to display approvals UI Controls operation 618, in which approvals controls, e.g., "Approve," "Reject" are shown. If not only approval messages were selected, flow branches NO to query operation 620, in which it is determined whether the user has selected one or more regular email items but has not selected any approval notifications. If only regular email items were selected, flow branches YES to display regular email controls operation 622 in which only regular email controls are shown. If not only regular email items were selected, flow branches NO to query operation 624, in which it is determined whether the selected items consist of regular email items and approval notifications. If yes, flow branches YES to disable and do not display operation 626, in which regular email controls are disabled and approval controls are not shown. If it is determined that neither regular email items nor approval notifications were selected, flow branches NO to end operation 628 which terminates process 613.

While FIGS. 6A and 6B display the operational characteristics for determining whether to dynamically display UI controls in a received message in accordance with an embodiment of the present invention, other embodiments provide for UI controls related to a business application to be displayed at all times. Instead of dynamically determining whether such controls are necessary based on the type of message received, such controls can be displayed at all times and in all message types. In other embodiments, and as noted above, the approval message not only prompts the UI to display certain buttons, but also describes how to display them even if these specific controls were not included in the email client or add-in, if any.

Figure 7:
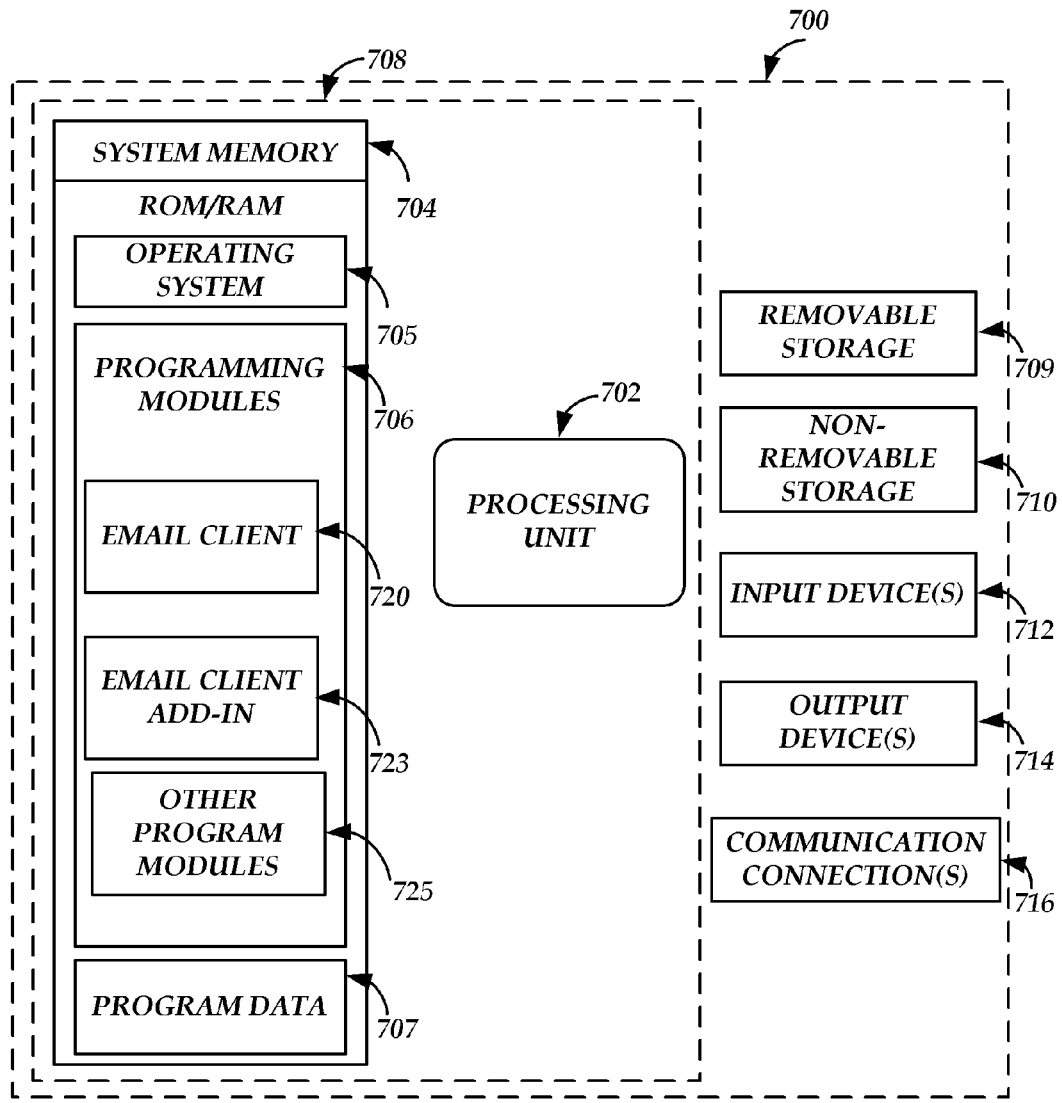
FIG. 7 is a block diagram of a system including a computing device for use in the networked operating environment of FIG. 1.

Turning now to FIG. 7, this figure is a block diagram of a system including a computing device 700, which may be used in conjunction with server 102, server 104, desktop computer 112, and laptop computer 114 in accordance with an embodiment of the present invention. Consistent with an embodiment of the invention, any suitable combination of hardware, software, or firmware may be used to implement a memory storage and processing unit. For example, the memory storage and processing unit may be implemented with the computing device 700 or any of the other computing devices in combination with the computing device 700. The aforementioned system, device, and processors are examples, and other systems, devices, and processors may comprise the aforementioned memory storage and processing unit, consistent with embodiments of the invention. Furthermore, the computing device 700 may comprise an operating environment for an associated system. The system may operate in other environments and is not limited to computing device 700.

With reference to FIG. 7, a system consistent with an embodiment of the invention may include a computing device, such as computing device 700. In a basic configuration, computing device 700 may include at least one processing unit 702 and a system memory 704. Depending on the configuration and type of computing device, system memory 704 may comprise, but is not limited to, volatile (e.g. random access memory (RAM)), non-volatile (e.g. read-only memory (ROM)), flash memory, or any combination. System memory 704 may include operating system 705, one or more programming modules 706, and may include a program data 707. Operating system 705, for example, may be suitable for controlling computing device 700's operation. In one embodiment, programming modules 706 may include a document creation application for creating and editing a document. Programming modules 706 may include an email client 720 for sending and receiving email and an email client add-in 723 for, among other purposes, and in accordance with an embodiment of the present invention: (1) rendering UI controls and dialogs that are not part of the email client, and to manage those controls as well as the controls of the email client itself; and (2) managing communications with the business process application where, according to some embodiments of the present invention where the email transport, or email system, is used to transport the message, the add-in 723 may compose the message in a way that is compliant with email transports, or email systems, and which can be interpreted by the email agent shown in FIG. 3B. In other embodiments where FIG. 7 describes a server, programming module 706 may be a business processing application or a database management system. As discussed above, the business processing application and/or database management system are located on different computers than the email client in accordance with an embodiment of the invention. Other programming modules 725 may be used in accordance with embodiments of the invention to display user interface controls to the user based on the message request, for example. Other modules may be used to process and/or record the user's response to the email message request. Still other modules may be used in accordance with embodiments to correlate a business workflow with the user's response to the email message request. Further processing modules may be used to determine a course of action for an associated business workflow based on the user's response to the email message request. Furthermore, embodiments of the invention may be practiced in conjunction with a graphics library, other operating systems, or any other application program and are not limited to any particular application or system. This basic configuration is illustrated in FIG. 7 by those components within dashed line 708.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by a removable storage 709 and a non-removable storage 710. Computer storage media may include volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 700. Any such computer storage media may be part of device 700. Computing device 700 may also employ input device(s) 712, such as a keyboard, a mouse, a pen, a sound input device, a touch input device, etc. Output device(s) 714, such as a display, speakers, a printer, etc. may also be included. The aforementioned devices are examples and others may be used.

Computing device 700 may also contain a communication connection 716 that may allow computing device 700 to communicate with other computing devices, such as over network 110 in a distributed computing environment, for example, an intranet or the Internet. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 704, including operating system 705. While executing on processing unit 702, programming modules 706 may perform processes including, for example, one or more method stages as described above. The aforementioned process is an example, and processing unit 702 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, e.g., smartphones, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage and processing devices, and the devices may be operated by one company or by multiple different companies.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general-purpose computer or in any other circuits or systems.

As noted, embodiments of the invention may be implemented as a computer process (method), a computing system, including a distributed computing system, operated by one or multiple organizations or companies, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list) exist, in which the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as show in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, as noted, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features, methodological acts, and/or computer-readable media containing such acts, the claims are not limited to the features or acts described above. One skilled in the art will recognize other embodiments or improvements that are within the scope and spirit of the present invention. Therefore, the specific structures, features, acts, or media are disclosed only as illustrative embodiments. The invention is defined by the appended claims.

What is claimed is:

1. A method for enabling interactions of a business process application with a general-purpose email client, the method comprising:
    receiving, by the email client, an electronic mail (email) message from the business process application, wherein the email message comprises a process ID, and wherein the process ID associates the email message with a workflow in the business process application;
    determining whether the email message is an approval message, wherein the approval message requests input for applying to the workflow in the business process application, wherein the determination of whether the email message is an approval message is performed by analyzing a message class of the email message;
    upon determining that the email message is an approval message, adding user interface (UI) controls related to a functionality required to respond to the approval message and disabling UI controls that are not required to respond to the approval message, wherein the UI controls are added to a toolbar of a window of the general-purpose email client displaying the approval message upon opening the approval message, and wherein the user interface controls are to indicate the following responses: Approve, Reject, Cancel, Delegate, Extend, Retire, Complete, Not Complete, Add, Remove, Expire, and Join;
    receiving a response to the request in the approval message;
    determining an endpoint to send the response by determining a type of the email message and comparing the type of the email message and correlating the determined type of message with a list that identifies one or more endpoints based on the type of the email message; and
    sending the response to the determined endpoint for processing the response, wherein the response comprises the process ID to enable the business process application at the determined endpoint to associate the response with the workflow.

2. The method of claim 1, wherein the response determines a course of action for the associated workflow.

3. The method of claim 1, wherein the method is performed by an add-in is integrated into the email client.

4. The method of claim 1, wherein the email message comprises business data.

5. The method of claim 4, wherein the process ID coordinates the approval message and the response with associated business tasks executed by the business process application.

6. The method of claim 1, wherein the endpoint to which to send the response to the request in the approval message is determined based on the content of the response to the request in the approval message.

7. The method of claim 1, wherein the disabled UI controls comprise at least one of Reply and Replay to All.

8. A system for enabling interactions of a business process application with a general-purpose email client, comprising:
    at least one processor; and
    memory coupled to the at least one processor, the memory comprising computer-program instructions executable by the at least one processor that when executed perform a method comprising:
    receiving, by the email client, an email message from the business process application, wherein the email message comprises a process ID, and wherein the process ID associates the email message with a workflow in the business process application;
    determining whether the email message is an approval message, wherein the approval message requests input for applying to the workflow in the business process application, wherein the determination of whether the email message is an approval message is performed by analyzing a message class of the email message;
    upon determining that the email message is an approval message:
        adding user interface (UI) controls related to a functionality required to respond to the approval message, wherein the UI controls are added to a toolbar of a window of the general-purpose email client displaying the approval message upon opening the approval message, and wherein the user interface controls are to indicate the following responses: Approve, Reject, Cancel, Delegate, Extend, Retire, Complete, Not Complete, Add, Remove, Expire, and Join; and
        disabling UI controls that are unrelated to the approval message from the toolbar of the window of the general-purpose email client;
    receiving a response to the request in the approval message;
    determining an endpoint to send the response by determining a type of the email message and comparing the type of the email message and correlating the determined type of message with a list that identifies one or more endpoints based on the type of the email message; and
    sending the response to the determined endpoint for processing response, wherein the response comprises the process ID to enable the business process application at the determined endpoint to associate the response with the workflow.

9. A system as defined in claim 8, further comprising determining a course of action for the workflow based on the response.

10. A system as defined in claim 8, wherein an email client add-in performs one or more from the group consisting of:
    determining whether the email message is an approval message, wherein the approval message requests input for applying to a workflow in the business process application;
    when the email message is an approval message, adding user interface (UI) controls related to a functionality required to respond to the approval message, wherein the UI controls are added to a toolbar of a window of the general-purpose email client displaying the approval message upon opening the approval message;

receiving a response to the request in the approval message; and sending the response to the business process application for processing the response.

11. A storage device storing executable instructions which, when executed by at least one processor, perform a method of enabling interactions of a business process application with a general-purpose email client, the method comprising:

receiving, by the general-purpose email client, an email message from the business process application;

determining whether the email message is an approval message by analyzing a message class of the email message, wherein the approval message requests input for applying to a workflow in the business process application, and wherein the approval message comprises a process ID that associates the email message with a workflow in the business process application;

upon determining that the email message is an approval message:

adding user interface (UI) controls related to a functionality required to respond to the approval message, wherein the UI controls are added to a toolbar of a window of the general-purpose email client displaying the approval message upon opening the approval message, and wherein the user interface controls are to indicate the following responses: Approve, Reject, Cancel, Delegate, Extend, Retire, Complete, Not Complete, Add, Remove, Expire, and Join; and disabling UI controls that are unrelated to the approval message from the toolbar of the window of the general-purpose email client;

receiving a response to the request in the approval message;

determining an endpoint to send the response by determining a type of the email message and comparing the type of the email message and correlating the determined type of message with a list that identifies one or more endpoints based on the type of the email message; and sending the response to the determined endpoint for processing the response, wherein the response comprises the process ID to enable the business process application at the determined endpoint to associate the response with the workflow.

12. The computer-readable storage medium as defined in claim 11, wherein an email client add-in performs one or more from the group consisting of:

determining whether the email message is an approval message, wherein the approval message requests input for applying to a workflow in the business process application;

when the email message is an approval message, adding user interface (UI) controls related to a functionality required to respond to the approval message, wherein the UI controls are added to a toolbar of a window of the approval message upon opening the approval message;

receiving a response to the request in the approval message; and sending the response to the business process application for processing the response.

13. The system of claim 10, wherein the email client add-in is integrated into the email client.

14. The system of claim 8, wherein the disabled UI controls comprise at least one of Reply and Reply to All.

15. The storage device of claim 11, wherein the disabled UI controls comprise at least one of Reply and Reply to All.

16. The storage device of claim 11, further comprising determining a course of action for the workflow based on the response.

17. The storage device of claim 11, wherein the response determines a course of action for the associated workflow.

* * * * *